(12) United States Patent
Maresca et al.

(10) Patent No.: US 6,940,248 B2
(45) Date of Patent: Sep. 6, 2005

(54) MOTION CONTROLLING

(75) Inventors: Robert Maresca, Hopkinton, MA (US); Thomas Aho, Hudson, MA (US)

(73) Assignee: Bose Corporation, Framington, MA (US)

( * ) Notice: Subject to any disclaimer, the term of this patent is extended or adjusted under 35 U.S.C. 154(b) by 0 days.

(21) Appl. No.: 10/623,818

(22) Filed: Jul. 21, 2003

(65) Prior Publication Data

US 2005/0017668 A1 Jan. 27, 2005

Related U.S. Application Data

(63) Continuation-in-part of application No. 08/677,380, filed on Jul. 5, 1996, now Pat. No. 6,597,145.

(51) Int. Cl.[7] .................................................. G05B 1/06
(52) U.S. Cl. ..................... 318/615; 318/651; 318/652
(58) Field of Search .............................. 318/560–579, 318/599–624, 651, 652; 364/148–177

(56) References Cited

U.S. PATENT DOCUMENTS

| | | | | |
|---|---|---|---|---|
| 3,673,395 A | * | 6/1972 | Tripp | ................... 702/96 |
| 4,814,680 A | * | 3/1989 | Hulsing | ..................... 318/561 |
| 5,184,055 A | * | 2/1993 | Ohishi et al. | ............... 318/615 |
| 5,894,209 A | * | 4/1999 | Takagi et al. | ............... 318/696 |
| 6,218,801 B1 | * | 4/2001 | Brog.ang.rdh et al. | ...... 318/567 |
| 6,374,157 B1 | * | 4/2002 | Takamura | ................... 700/245 |

* cited by examiner

Primary Examiner—Bentsu Ro
(74) Attorney, Agent, or Firm—Fish & Richardson P.C.

(57) ABSTRACT

Motion controlling includes a combining network having an acceleration input for receiving an acceleration signal representative of acceleration of a movable element and a position input for receiving a position signal representative of position of the movable element and an output for providing an inferred position signal representative of an inferred position of the movable element. The network includes a first signal processor for processing the acceleration signal to provide modified acceleration signal, a second signal processor for processing the position signal to provide a modified position signal and a combiner for combining the modified acceleration signal with the modified position signal to provide the inferred position signal.

8 Claims, 15 Drawing Sheets

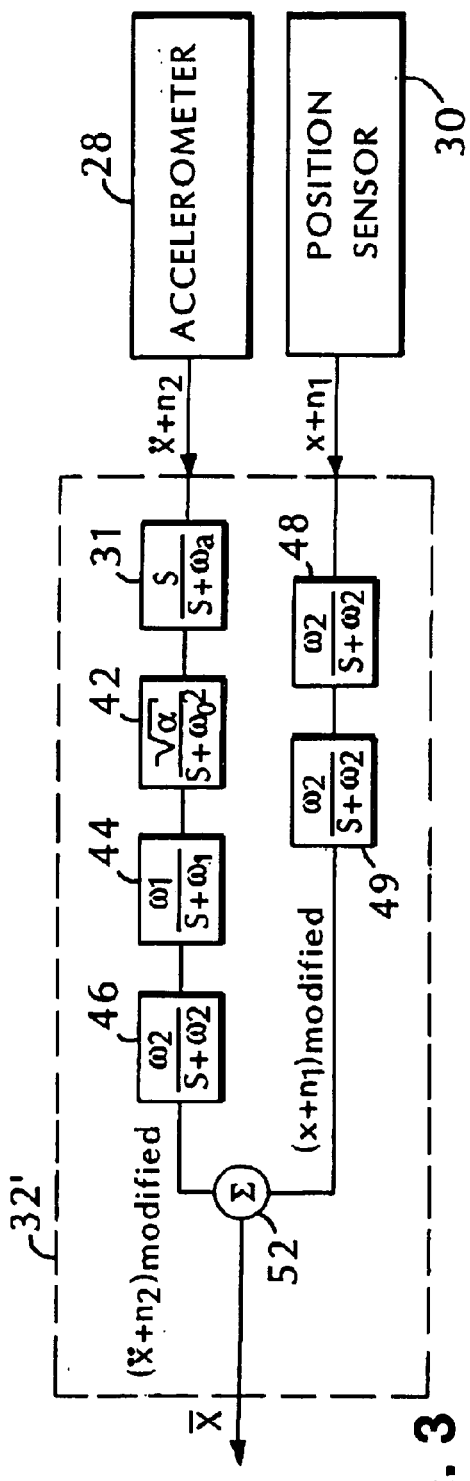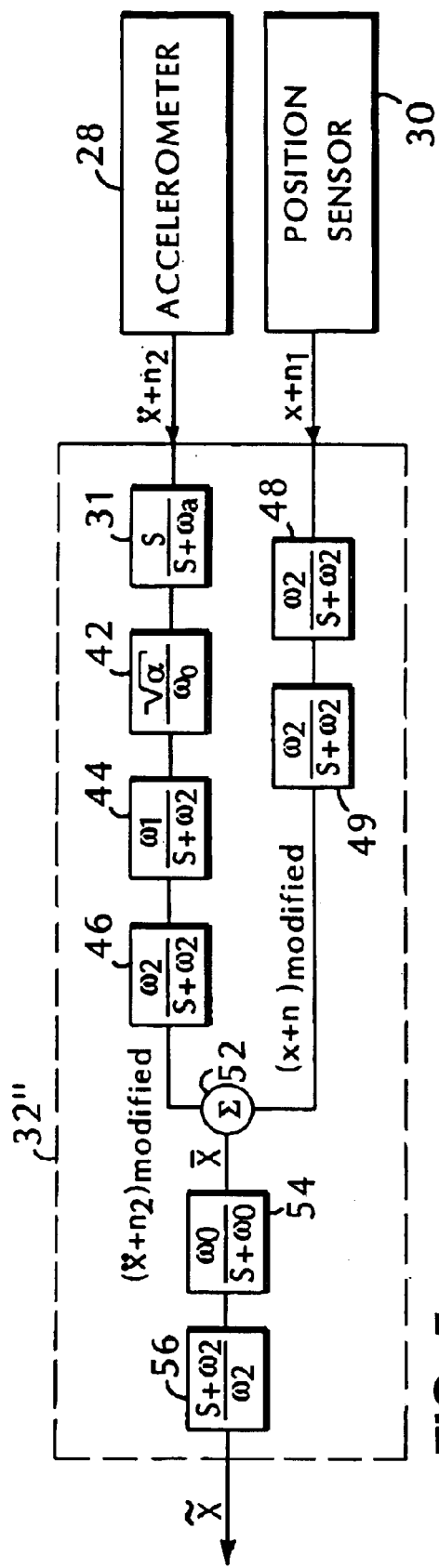
FIG. 3
FIG. 5

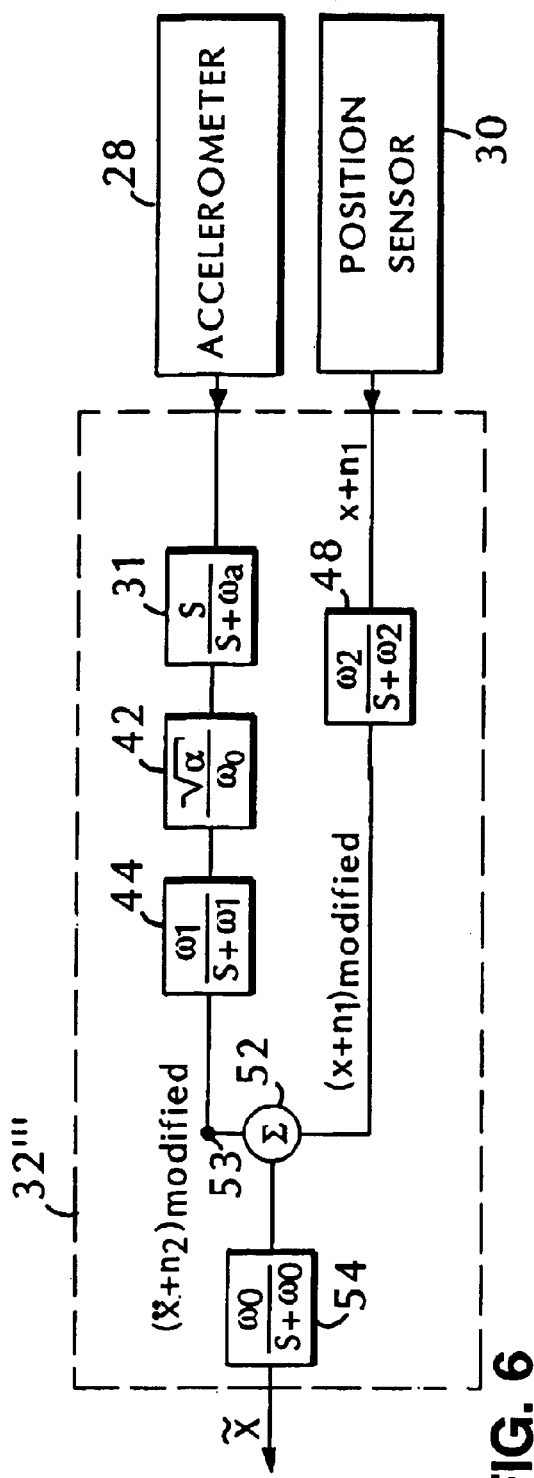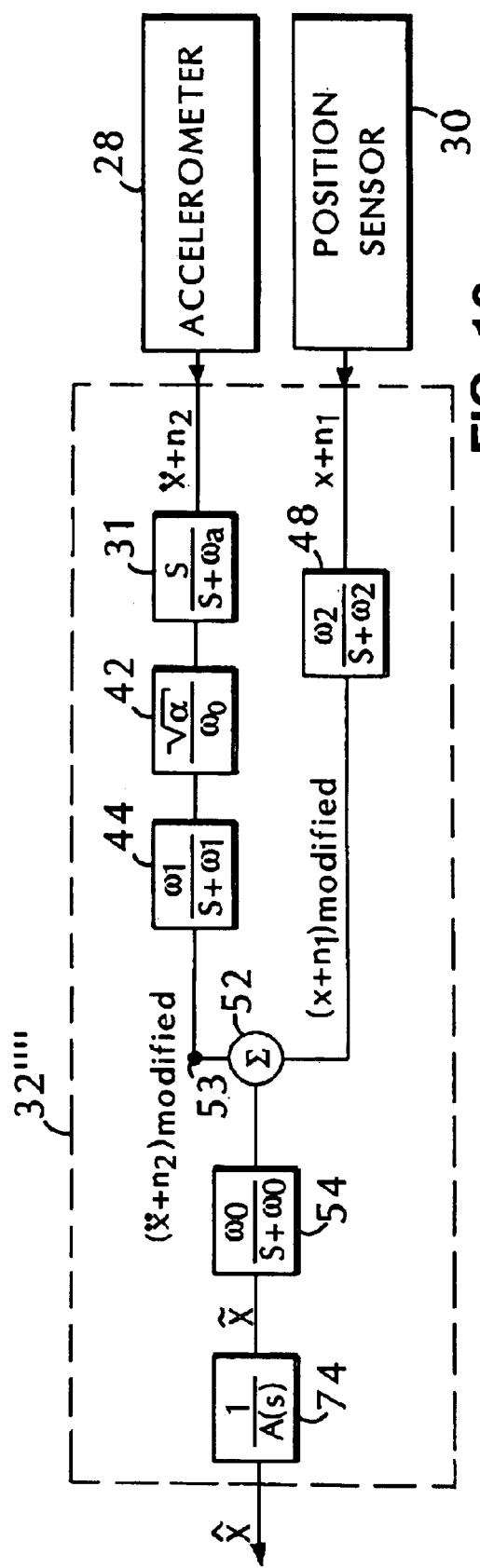

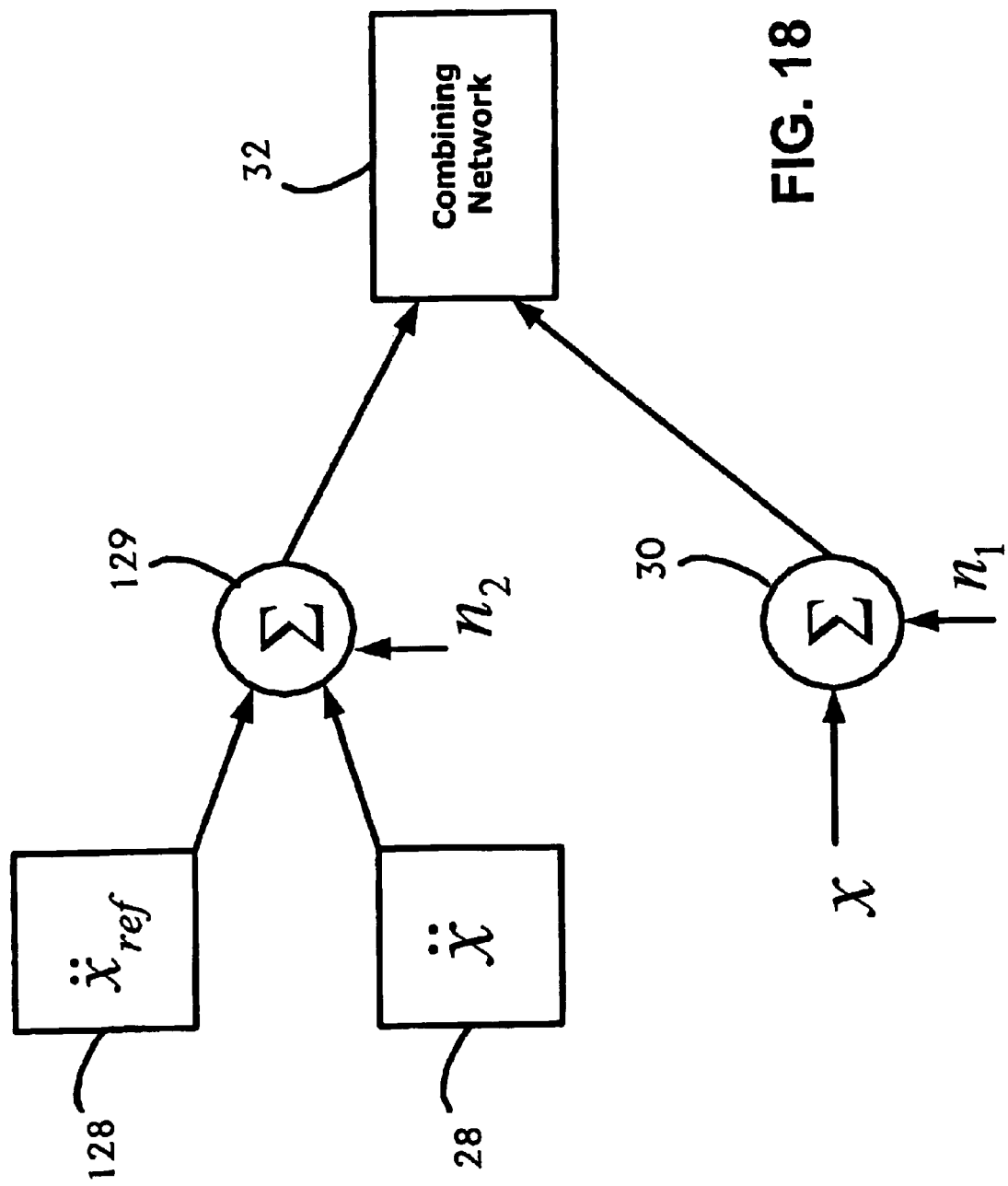

MOTION CONTROLLING

CLAIM OF PRIORITY

This application is a continuation-in-part and claims priority under 35 USC §119(e) to U.S. patent application Ser. No. 08/677,380, filed on Jul. 5, 1996, entitled MOTION CONTROLLING, now U.S. Pat. No. 6,597,145, the entire contents of which are incorporated herein by reference.

TECHNICAL FIELD

The invention relates to servo systems, and more particularly to motion controlling and position sensing, and still more particularly to motion control systems employing accelerometers.

BACKGROUND OF THE INVENTION

For background, reference is made to Dorf and Bishop, *Modern Control Systems*, Seventh Edition, 1995, Addison-Wesley Publishing Company, ISBN 0-201-50174-0, especially to Chapters 2, 4 and 8.

It is an important object of the invention to provide improved motion controlling.

BRIEF SUMMARY OF THE INVENTION

In one aspect of the invention, a combining network in a closed loop feedback control system combines an acceleration signal (representing an acceleration of a movable element) and a position signal (representing a position of the movable element) to produce an inferred position signal (representing an inferred position of the movable element). The combining network includes a first signal processor for processing the acceleration signal to provide a processed acceleration signal and a combiner for combining the processed acceleration signal with the position signal to provide the inferred position signal.

In another aspect of the invention, in a closed loop feedback control system, a method for combining an acceleration signal and a measured position signal to provide an inferred position signal includes low-pass filtering the acceleration signal to provide a filtered acceleration signal and combining the filtered acceleration signal with the measured position signal to provide the inferred position signal.

In another aspect of the invention, apparatus for detecting position includes an accelerometer for providing an acceleration signal representative of acceleration, a position sensor for providing a position signal representative of position, a first processor for processing the acceleration signal to provide a modified acceleration signal, a combiner for combining the acceleration signal and the position signal to yield an inferred position signal representative of inferred position.

In another aspect of the invention, a motion control apparatus includes a movable element, an input for receiving a signal representative of a desired position of the movable element, a position sensor for providing a position signal representative of the position of the movable element, an accelerometer for providing an acceleration signal representative of the acceleration of the movable element, and a combining network for combining the position signal and the acceleration signal for providing an inferred signal representative of an inferred position for the movable element. The combining network includes a first processor for processing the acceleration signal to provide a processed acceleration signal, a combiner for combining the processed acceleration signal and the position signal to provide the inferred position signal, a summer for comparing the inferred position signal with the desired position signal to provide a control signal, and a mover responsive to the control signal for moving the movable element to reduce the difference between the inferred position and the desired position.

In another aspect of the invention, a circuit for combining the acceleration signal and the position signal to provide the inferred signal includes an input for the acceleration signal; a first resistor having an input connected to the acceleration signal input; a first capacitor having an input connected to the output of the first resistor and having a grounded output; a second resistor having an input connected to the input of the first capacitor and the output of the first resistor; an input for the position signal; a third resistor having an input connected to the input for the position signal; a second capacitor having an input and an output, the input of the second capacitor connected to the output of the third resistor and the output of the second capacitor being grounded; a fourth resistor having an input connected to the input of the second capacitor and the output of the third resistor; an operational amplifier having an inverting input connected to the output of the second resistor and the output of the fourth resistor, the noninverting input of the operational amplifier being grounded; a fifth resistor having an input coupled to the output of the second resistor and the output of the fourth resistor; an output for the inferred signal coupled to the output of the fifth resistor and to the output of the operational amplifier; and a fifth capacitor, connected in parallel with the fifth resistor.

In another aspect of the invention, a position detection apparatus includes an accelerometer for providing an acceleration signal representative of acceleration of a movable element, a combining network having an acceleration input for receiving the acceleration signal, a position input for receiving a position signal representative of position of the movable element, and an output for providing an inferred position signal representative of an inferred position of the movable element. The network includes a first signal processor for processing the acceleration signal to provide a modified acceleration signal. The first signal processor includes a low-pass filter, a second signal processor for processing the position signal to provide a modified position signal, and a combiner for additively combining the modified acceleration signal with the modified position signal to provide the inferred position signal.

In another aspect of the invention, a position detection method for processing an acceleration signal and a measured position signal representative of acceleration and position, respectively, of a movable element to provide an inferred position signal includes low-pass filtering the acceleration signal and additively combining the low-pass filtered acceleration signal with the position signal to provide the inferred position signal.

In another aspect of the invention, a closed loop motion control apparatus includes a movable element having a position, an accelerometer for providing an acceleration signal representative of acceleration of the movable element, a combining element, for combining a reference position signal and an inferred position signal to provide an error signal, a controller, for providing a control signal responsive to the error signal, and an actuator, for applying a force, responsive to the control signal, to the movable element to change the position of the movable element. The force results in the acceleration of the movable element. The apparatus further includes a feedback loop, for providing the inferred position signal. The feedback loop includes a combining network for providing the inferred position signal. The combining network includes an acceleration input for receiving the acceleration signal, a position input for receiving a position signal representative of position of the movable element, and an output for providing an inferred position signal representative of an inferred position of the movable element. The network includes a first signal processor for processing the acceleration signal to provide a modified acceleration signal. The first signal processor includes a low-pass filter, a second signal processor for processing the position signal to provide a modified position signal, and a combiner for additively combining the modified acceleration signal with the modified position signal to provide the inferred position signal.

In still another aspect of the invention, an open loop position detection apparatus includes an accelerometer for providing an acceleration signal representative of acceleration of a movable element, a combining network having an acceleration input for receiving the acceleration signal, a position input for receiving a position signal representative of position of the movable element, and an output for providing an inferred position signal representative of an inferred position of the movable element. The network includes a first signal processor for processing the acceleration signal to provide a modified acceleration signal, the first signal processor comprising a low-pass filter, a second signal processor for processing the position signal to provide a modified position signal, and a combiner for additively combining the modified acceleration.

A motion control system according to the invention is advantageous, because it greatly enhances the signal to noise ratio in providing the position signal, thereby enabling more accurate control of position in the presence of noise. Furthermore, in digital control systems, a motion control system according to the invention, is free of an anti-aliasing filter and consequently allows the faster sampling rates and greater bandwidth; because at high frequencies, the invention uses the relatively high signal-to-noise ratio acceleration signal for providing the inferred position signal; and because at high frequencies the relatively low signal-to-noise ratio position signal is heavily filtered, thereby significantly attenuating noise.

Other features, objects, and advantages will become apparent from the following detailed description, which refers to the following drawings in which:

BRIEF DESCRIPTION OF THE SEVERAL VIEWS OF THE DRAWING

FIG. 3 is a block diagram of an embodiment of the combining network portion of FIGS. 1 and 2;

FIG. 5 is a block diagram of an alternate embodiment of the combining network portion of FIG. 2;

FIG. 6 is a block diagram of a simplified version of the combining network of FIG. 5;

FIG. 10 is a block diagram of an alternate embodiment of the combining network of FIG. 2;

FIGS. 17 and 18 are block diagrams of another open loop system incorporating the invention.

DETAILED DESCRIPTION

Figure 1:
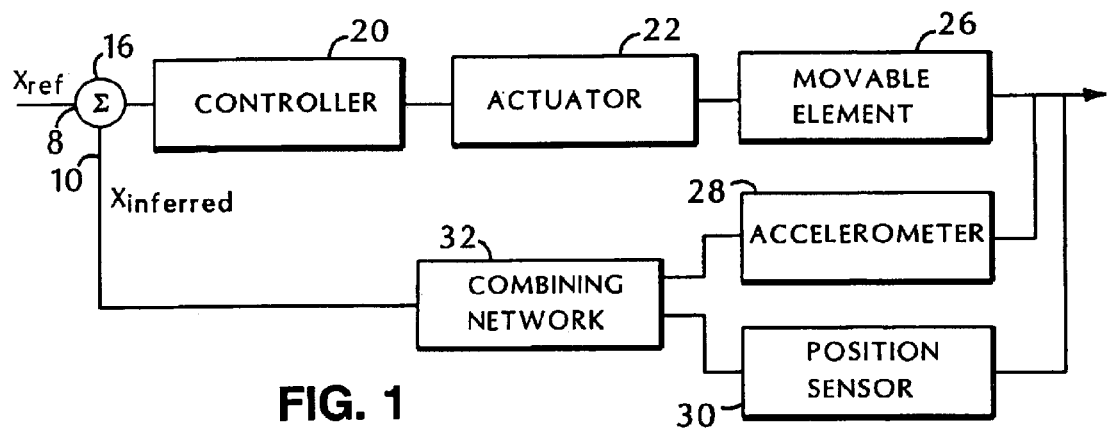
FIG. 1 is a block diagram of a motion control system according to the invention.

With reference now to the drawings and more particularly to FIG. 1, there is shown a block diagram of a position control system according to the invention. Corresponding elements are identified by the same reference symbols throughout the drawings. Summer 16 has an input 8 for receiving a reference position signal $x_{ref}$ and an input 10 for receiving an inferred position signal $x_{inferred}$. Summer 16 is coupled to a controller 20, which is in turn coupled to an actuator 22. Actuator 22 is mechanically coupled to a movable element 26 to move the element. Movable element 26 is coupled to an accelerometer 28 and to a position sensor 30. Accelerometer 28 and position sensor 30 are coupled to a combining network 32, which is in turn coupled to input 10 of summer 16.

Summer 16, actuator 22, movable element 26, and position sensor 30 may be conventional devices, and controller 20 may be a conventional PID (proportional integral derivative) controller. The invention is useful in a wide variety of applications (including, but not limited to, those mentioned above) and with other components (including, but not limited to, other types of controllers) to detect or control the position of devices.

Figure 2:
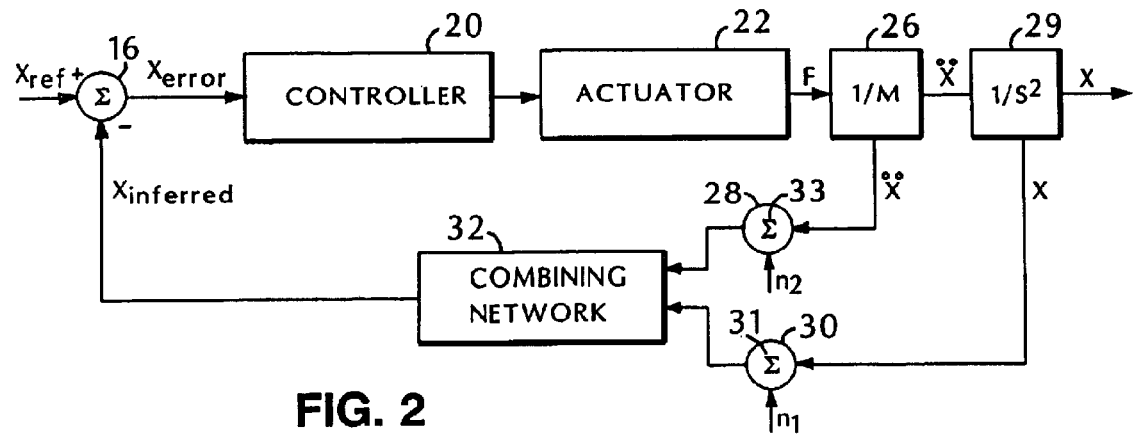
FIG. 2 is a block diagram of the motion control system of FIG. 1, with transfer functions of various elements.

Referring now to FIG. 2, there is shown the position control system of FIG. 1 with blocks designating transfer functions associated with some elements. Summer 16 provides an error signal $x_{error}$ representative of the difference between the signals $x_{ref}$ and $x_{inferred}$ (that is sums [$x_{ref}$ and $-x_{inferred}$] indicated by the "+" at summer input 8 and the "−" at summer input 10 or sums [$-x_{ref}$ and $x_{inferred}$]). Controller 20 responds to the error signal by furnishing a control signal to actuator 22 for reducing the error signal. Actuator 22 applies a force F to movable element 26, resulting in an acceleration (a or, the second derivative of the position x) according to the Newtonian formula F=ma. Accelerometer 28 (shown in FIG. 2 as a summer for reasons that will be explained below) provides an acceleration signal representative of the acceleration. Position sensor 30 measures the position x, which is the second integral of the acceleration, receives a position signal representative of the second integral of the acceleration. Summers 31 and 28 receive noise $n_1$ and $n_2$ added to the position signal x and acceleration measurement signal, respectively. Combining circuit 32 accepts as input the acceleration signal with noise $n_2$ from accelerometer 28 and the position signal with noise $n_1$ from position sensor 30 provides an inferred position signal $x_{inferred}$ which is fed back to summer 16.

Referring now to FIG. 3, there is shown combining network 3 in more detail. The combining network which has at least two inputs selectively weighs the inputs based on frequency bands, and combines the weighted inputs to provide the inferred acceleration signal. In the embodiment of FIG. 2, the combining network has as one input an acceleration signal, representative of the acceleration of a movable element, as a second input a position, representative of position of the movable element, and as an output a signal of an inferred position $x_{inferred}$. A "crossover frequency" as used herein, refers to a predetermined frequency at which two inputs to combining network are weighted relatively equally.

Still referring to FIG. 3, the output of accelerometer 28 (which includes the acceleration and noise $n_2$), is modified by a number of modifiers, which may include a high pass filter 31 and a scaler 42. The quantities $\alpha$ and $\omega_0$ defining the scaling factor are described below. The output of scaler 42 is low pass filtered by low pass filter 44 which has a break frequency $\omega_1$ cascaded with a second low-pass filter 46 which has a break frequency $\omega_2$ to yield a modified accelerometer output signal $(+n_2)_{modified}$.

The output of the position sensor 30, which includes the position measurement signal x and noise $n_1$, is filtered by cascaded low-pass filters 48 and 49 with break frequencies of $\omega_2$, to yield a modified position sensor output signal $(x+n_1)_{modified}$. The modified accelerometer output signal and the modified position sensor output signal are combined by combiner 52 to yield an output. The frequencies $\omega_1$ and $\omega_2$ are frequencies with the relationship $\omega_1\omega_2=\omega_0^2$ (where $\omega_0$ is the crossover frequency, that is, a predetermined frequency at which the inputs from the accelerometer and the position sensor are weighted approximately equally by the combining network) and $\alpha$ is defined as the quantity $\omega_2/\omega_1$.

Figure 4:
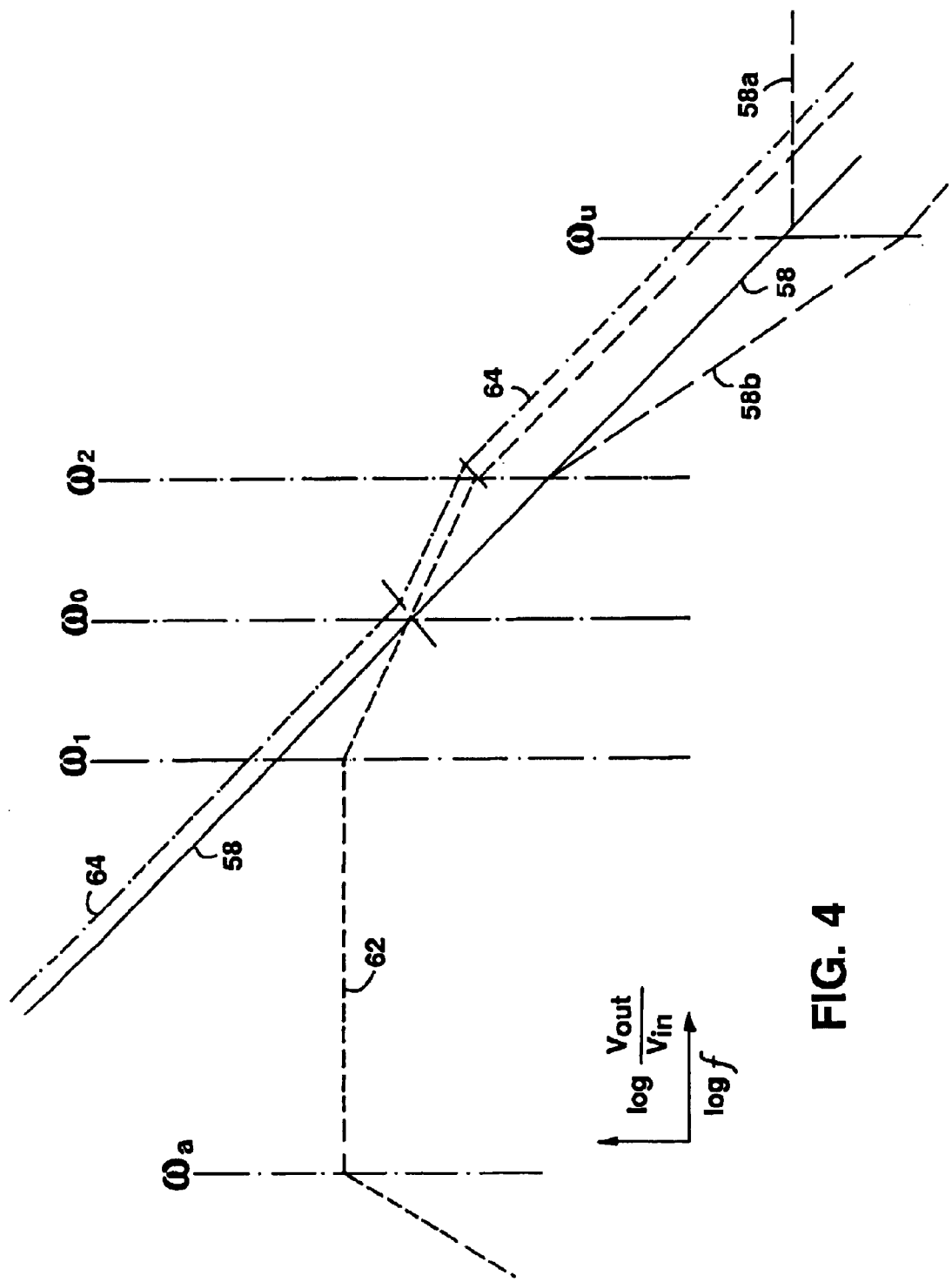
FIG. 4 is a Bode plot of the effects on position and acceleration signals of the elements of the block diagram of FIG. 3.

Referring to FIG. 4, there is a Bode plot showing the effects on the signals of the elements of the block diagram of FIG. 3. The curves of FIG. 4 represent the normalized output of the various elements of FIG. 3 (in the form of log ($V_{out}/V_{in}$)) as a function of frequency. Curve 58 represents a signal representing the actual position. Curve 58–58a (assuming for the purpose of this explanation, a "white noise" model) represents the modified position signal. At low frequencies, the signal to noise ratio is high, and the position signal accurately represents the actual position. However, at high frequencies, at when the position signal becomes smaller but the noise does not, the signal to noise ratio is smaller, and the position signal diverges from accurately representing the actual position. The position sensor signal 58a at high frequencies (such as $\omega_a$) begins to diverge from the actual position signal 58. Low pass filters 48 and 49 modify the position signal so that curve 58–58b represent the output of the second of the low pass filters 48. At frequencies below $\omega_2$, low pass filters 48 and 49 pass the signal from position sensor 30. However, the cascaded low pass filters 48 and 49 sharply attenuate spectral components above $\omega_2$.

Curve 62 represents the acceleration signal essentially constant below $\omega_1$. Optional high pass filter 31 significantly attenuates spectral components above $\omega_a$ and has virtually no effect at frequencies in the range of $\omega_0$, $\omega_1$ and $\omega_2$. Low pass filters 44 and 46 having break frequencies at $\omega_1$ and $\omega_2$, respectively, decrease the slope of curve 62 to match that of curve 58 above $\omega_2$. Effectively, the two low pass filters double integrate the acceleration signal to yield a position signal.

Curve 64 represents the output of signal combiner 52. At low frequencies, the modified output from position sensor 30 represented by curve 58–58b is of greater magnitude than the modified output accelerometer 28, so the output of summer 52 approximates the modified output 58–58b of position sensor. Therefore, at low frequencies, the value can be used for the inferred position $x_{inferred}$ in the control system of FIGS. 1 and 2.

At high frequencies, the modified output represented by curve 62 from accelerometer 28 is of greater magnitude than the modified output represented by curve 58–58B from position sensor 30, so the output represented by curve 64 of combiner 52 approximates the modified output represented by curve 62 of accelerometer 28. FIG. 4 shows that the output represented by curve 64 of combiner 52 varies from the actual position signal curve 58 in the region between $\omega_0$ and $\omega_2$.

Referring to FIG. 5, there is shown combining network 32" which is the combining network 32' of FIG. 3 with additional signal processors to correct for the effect of the different slope of line 62 in the region between $\omega_0$ and $\omega_2$. Signal processor 54, which has a transfer characteristic with a pole at $\omega_0$ and signal processor 56 has a transfer characteristic with a zero at $\omega_2$ process the output $\tilde{x}$ of combiner 52 to produce a modified inferred position signal $\tilde{x}$. The product of the transfer characteristic of signal processor 56 and those of low-pass filters 46 and 49 is unity so these signal processors may be omitted from the block diagram of FIG. 5 to form the equivalent block diagram of FIG. 6.

Referring to FIG. 6, combining network 32''' provides an output signal that can be expressed as:

$$\tilde{x} = \left(\frac{\omega_0\omega_2}{(s+\omega_0)(s+\omega_2)}\right)x + \left(\frac{\frac{\sqrt{\alpha}}{\omega_0^2}*\omega_0\omega_1}{(s+\omega_0)(s+\omega_1)}\right)\ddot{x} + $$
$$\left(\frac{\omega_0\omega_2}{(s+\omega_0)(s+\omega_2)}\right)n_1 + \left(\frac{1}{(s+\omega_0)(s+\omega_1)}\right)n_2$$

which reduces to $$\tilde{x} = \left(\frac{s^2+(\sqrt{\alpha}-1)\omega_0 s+\omega_0^2}{s^2+(\sqrt{\alpha}+(1/\sqrt{\alpha}))\omega_0 s+\omega_0^2}\right)x + $$
$$\left(\frac{\omega_0\omega_2}{(s+\omega_0)(s+\omega_2)}\right)n_1 + \left(\frac{1}{(s+\omega_0)(s+\omega_1)}\right)n_2$$

Since the break frequency $\omega_a$ of the high pass filter 31 is significantly lower than the crossover frequency $\omega_0$ or frequencies $\omega_1$ and $\omega_2$, its effect on the signal is negligible and may be neglected. For $\alpha>>1$, the value of the coefficient $$\left(\frac{s^2+(\sqrt{\alpha}-1)\omega_0 s+\omega_0^2}{s^2+(\sqrt{\alpha}+(1/\sqrt{\alpha}))\omega_0 s+\omega_0^2}\right)$$

of the position signal x, A(s) hereafter, is approximately 1. The cascaded low-pass filters significantly attenuate the two noise terms $n_1$ and $n_2$ integrates the output signal from accelerometer 28 to provide a velocity signal representative of the velocity of movable element 26 on terminal 53.

Figure 7:
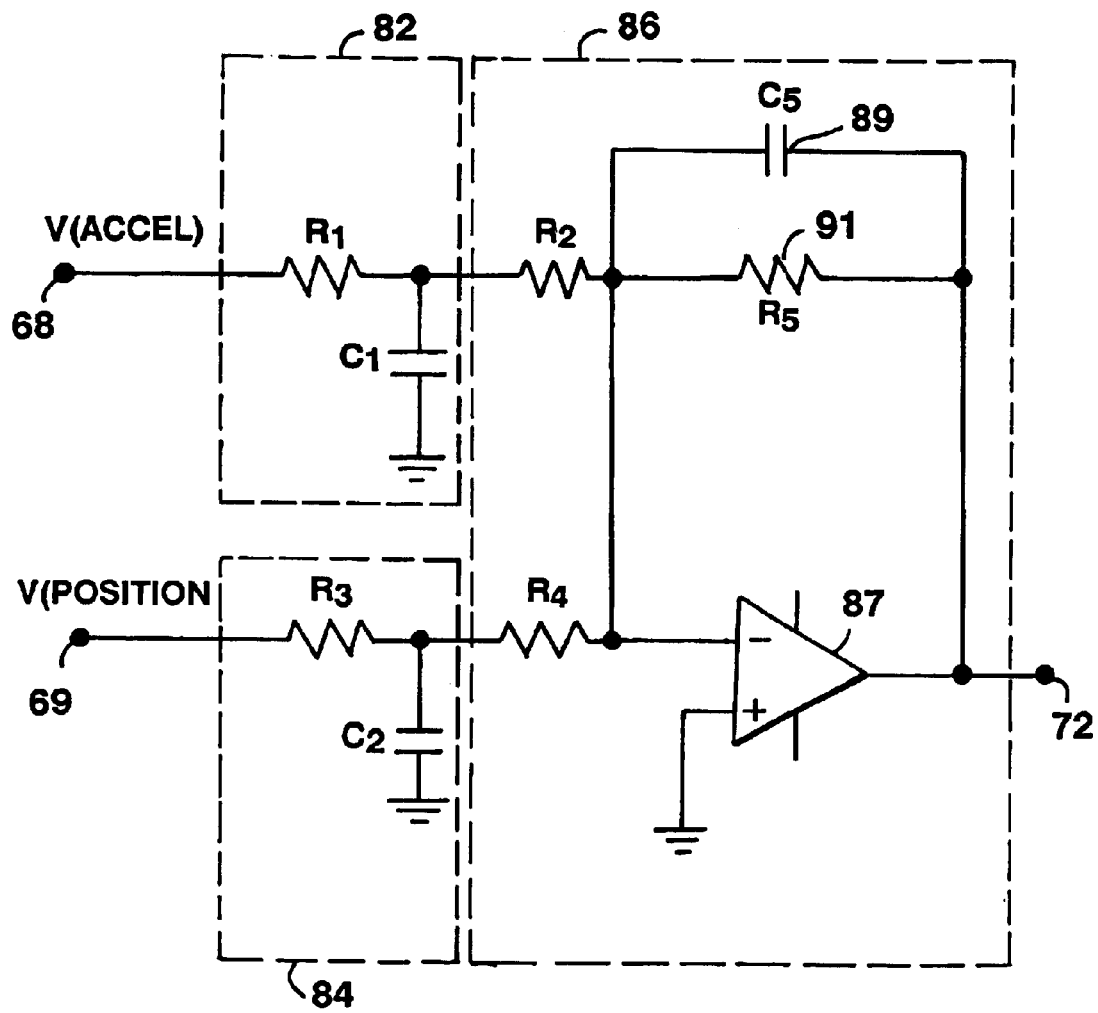
FIG. 7 is a schematic diagram of a circuit which implements elements of the combining network of FIG. 6.

Referring to FIG. 7, there is shown a schematic diagram of a circuit embodying the combining network of FIG. 6. Inputs 68 and 69 are connected to the outputs of accelerometer 28 and position sensor 30, respectively. Low pass filters 44 and 48 of FIG. 6 correspond to first and second resistor and capacitor pairs 82 and 84, respectively, and summer 52, signal processor 42 and low pass filter 54 of FIG. 6 are in circuit 86, which includes operational amplifier 87, capacitor 89 and resistor 91 connected in parallel. High pass filter 31 is conventional and not shown in FIG. 7.

Figure 8:
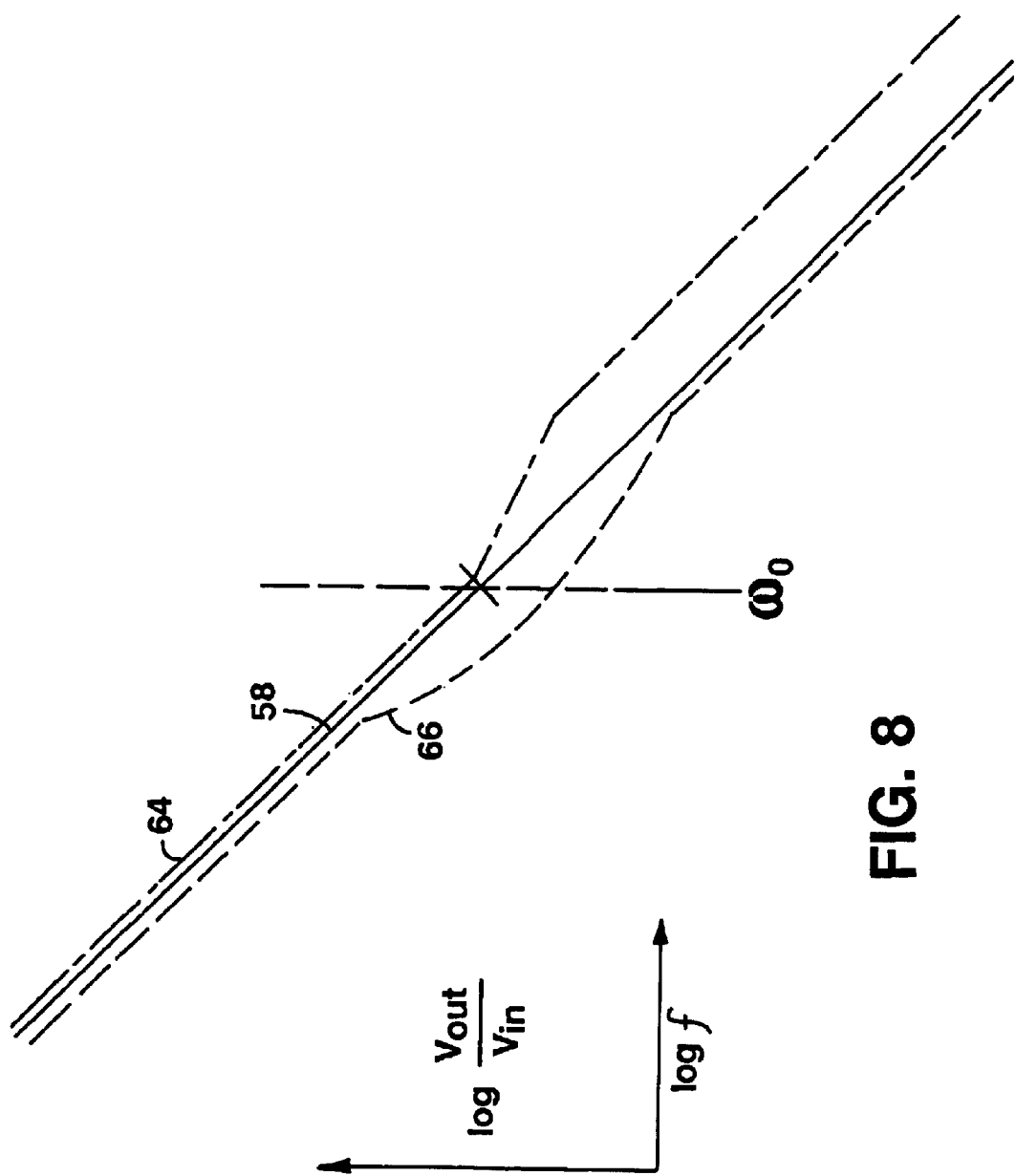
FIG. 8 is a Bode plot showing the effects of the combining network of FIG. 6.

Referring to FIG. 8, there is shown a Bode plot with curve 64 representing the output signal (see also FIG. 4) of a combining network as shown in FIG. 3, a curve 58 of a signal representing the actual position, and output signal 66 of a combining network as shown in FIG. 6 (normalized) as a function of frequency. Curve 64 is a close representation of the actual position, deviating slightly in the region of frequencies near the crossover frequency $\omega_0$.

Figure 9A:
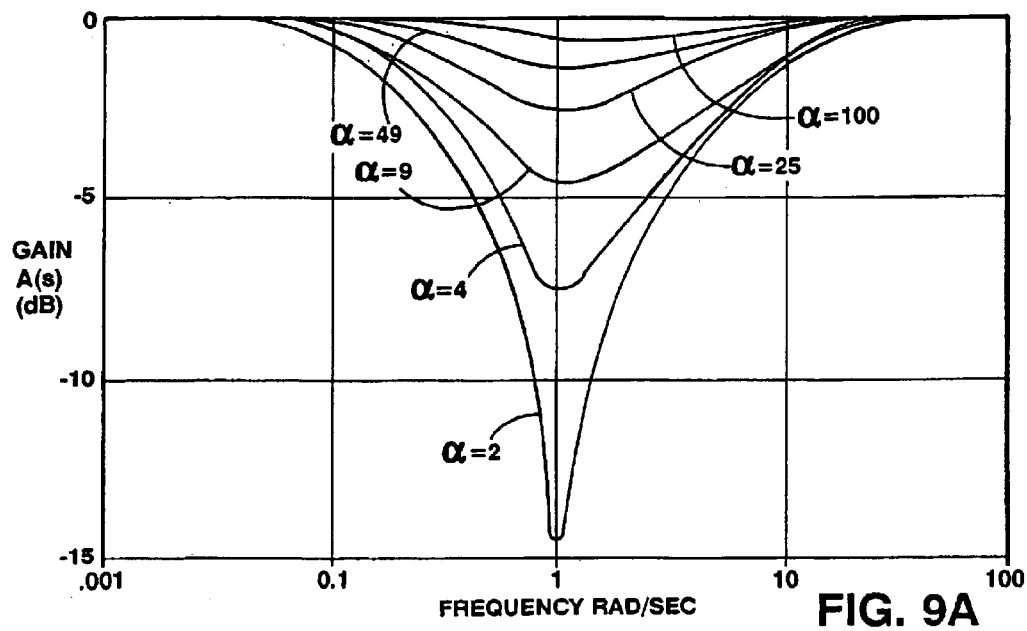
FIG. 9a is a Bode plot of gain in dB vs. log frequency for some values of a defined ratio $\alpha$.

Referring to FIG. 9a, there is shown a Bode plot of gain in dB for the transfer function A(s) for various values of $\alpha$, normalized to a frequency of 1 radian/sec. At higher values of $\alpha$, the gain of the transfer function A(s) approaches zero dB (indicating that the value of A(s) approaches 1 as was noted above).

Figure 9B:
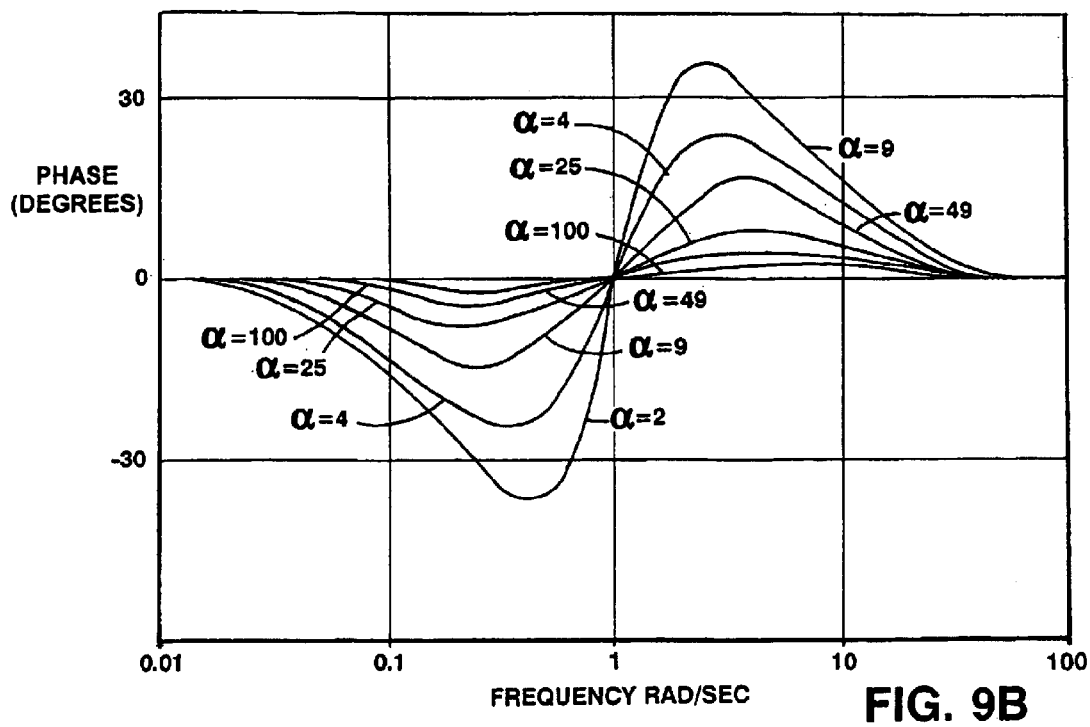
FIG. 9b is a Bode plot of phase in degrees vs. log frequency for some value of the a defined ratio $\alpha$.

Referring to FIG. 9b, there is shown a graph of phase in degrees as a function of frequency on a logarithmic scale for the transfer function A(s) for the same values of $\alpha$. The phase shift at higher values of $\alpha$ approaches zero. The graphical representation of FIGS. 8, 9a and 9b show that for large values of $\alpha$, the output of the combining network of FIG. 6 is a close representation of the actual position. The combining network of FIG. 6 is especially useful in the position control system of FIGS. 1 and 2, with the output signal of FIG. 6 used for the signal $x_{inferred}$ of FIGS. 1 and 2.

Referring to FIG. 10, there is shown a block diagram of a combining network 32'''' which yields a closer representation of actual position in the region near the crossover frequency $\omega_0$. The network of FIG. 10 includes the elements of FIG. 6, plus a reconstruction filter 74. Reconstruction filter 74 cancels the effect of the transfer function A(s) and therefore yields as an output, which is virtually an exact representation of the actual position, and the combining network of FIG. 10 can be used in the position control system of FIGS. 1 and 2 with the output signal used for the signal $x_{inferred}$ in FIGS. 1 and 2.

Figure 11:
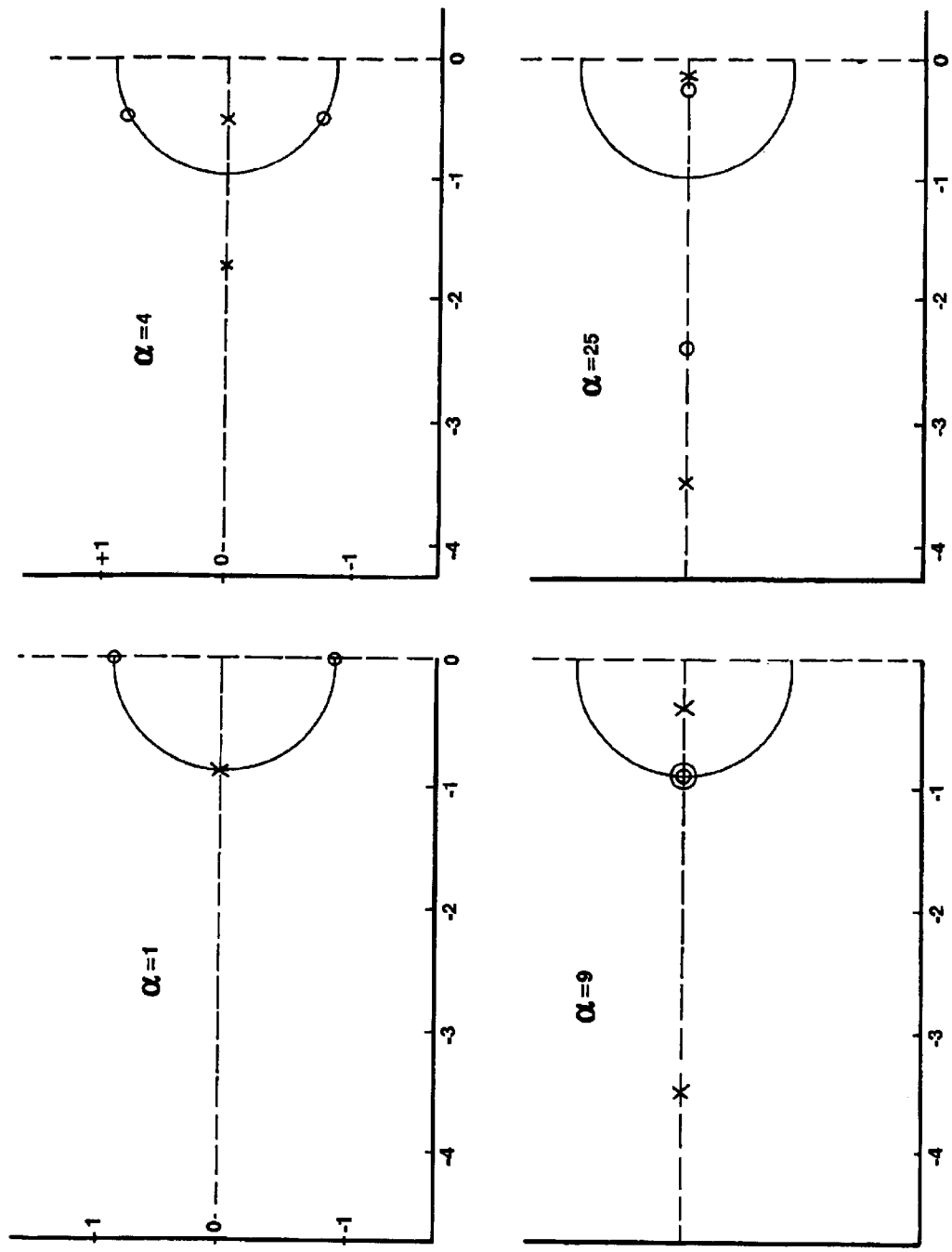
FIG. 11 is a pole/zero diagram for the defined transfer function A(s) for various values of a defined ratio $\alpha$.

Referring to FIG. 11, there is shown a pole/zero diagram for the coefficient A(s) for various values of $\alpha$. Applying a quadratic formula for all $\alpha \geq 9$, the singularities are real, and therefore, with the teachings of this disclosure, the reconstruction filter can be implemented with simple passive components. For values of $\alpha<9$, the poles of the reconstruction filter 74 can be implemented actively with resistors and capacitors or passively with inductors and capacitors.

Figure 12:
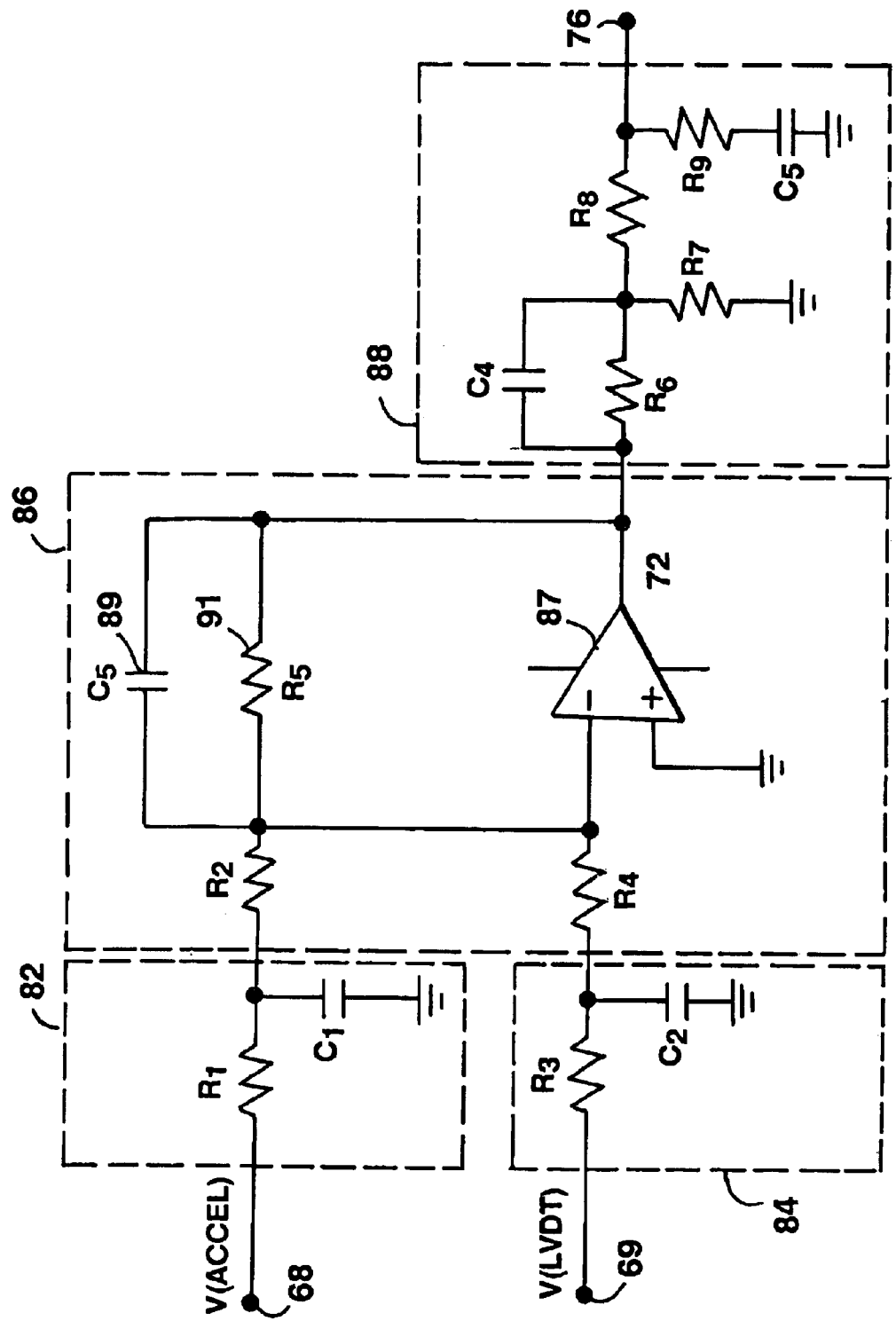
FIG. 12 is a circuit which implements elements of the block diagram of FIG. 10.

Referring to FIG. 12, there is shown a circuit embodying the network of FIG. 10. The resistor capacitor pairs (82 and 84) and the circuit 86 correspond to the similarly identified circuits of FIG. 7. The reconstruction filter circuit 88 corresponds to reconstruction filter 74 of FIG. 10. The output at terminal 76 is a signal representing the value of $x_{inferred}$ of FIG. 1, with significantly attenuated noise, and with the measured value that is virtually an exact representation of the actual position of x.

Figure 13:
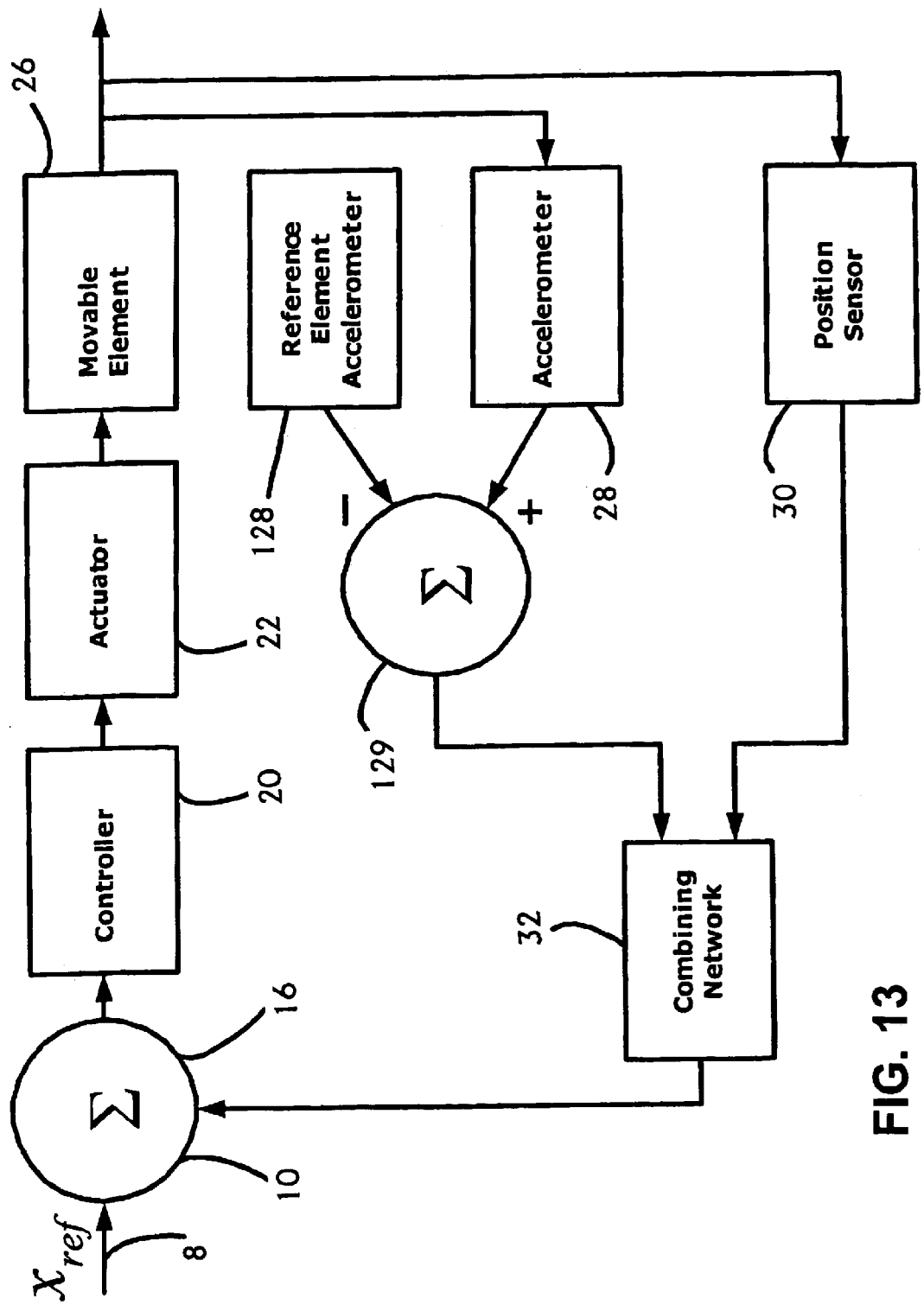
FIGS. 13 and 14 are block diagrams of another motion control system according to the invention.
Figure 14:
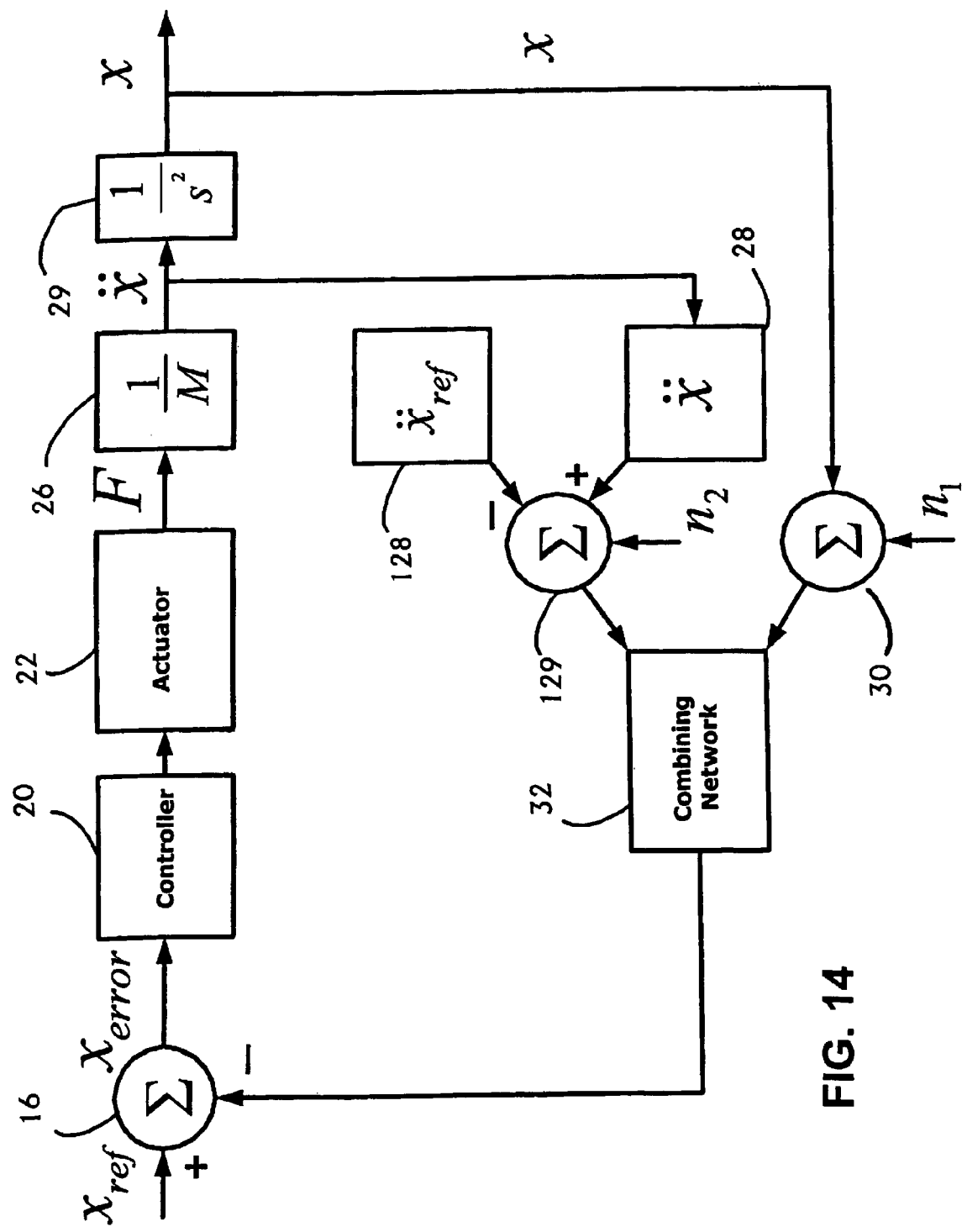

Referring to FIGS. 13 and 14, there is shown a block diagram of another motion control system according to the invention. FIGS. 13 and 14 include the elements of FIG. 1 and FIG. 2, respectively, and in addition include some additional elements. FIG. 13 includes reference element accelerometer 128 and acceleration combiner 129. Reference element accelerometer 128 provides an acceleration signal representative of the acceleration of a reference element. One input of acceleration combiner 129 is additively coupled to the output of accelerometer 28 and a second input of acceleration combiner 129 is subtractively coupled to reference element accelerometer 129. The output of acceleration combiner 129 is coupled to input of combining network 32.

Referring to FIG. 14, summer 129 differentially combines acceleration signal from accelerometer 28 and reference acceleration signal from reference element accelerometer 128. Summer 129 receives noise $n_2$ that is a part of acceleration signal and reference acceleration signal.

In FIGS. 13 and 14, combining network 32 may take the forms of the element 32' of FIG. 3, element 32" of FIG. 5, element 32''' of FIG. 6, or element 32'''' of FIG. 10, and can be implemented by the circuits of FIGS. 7 and 12.

An implementation of the invention according to FIGS. 13 and 14 is useful for a feedback control system in which a reference element cannot be assumed to be an inertial ground.

A first practical example of the implementation of FIGS. 13 and 14 is a manufacturing operation in which a jig has an element that is movable with respect to a fixture, and in which the jig is portable so that it moves along an assembly line. In such an implementation, reference element accelerometer 128 could measure the acceleration of the jig so that the position calculated by the combining network represents an accurate position of the movable element relative to the jig, and is unaffected by the movement of the jig.

A second practical example is a motion control system in which the actuator exerts high force but which requires a high degree of positional accuracy. In such an implementation, reference element accelerometer 128 may measure the acceleration of the machine itself so that the machine does not need to be structurally rigid, and so that the machine can be mounted in such a manner (such as on shock absorbing mounts) that the machine does not transmit vibration to the element to which the machine is mounted.

A third practical example is an active vehicle suspension which operates to control or minimize the vertical position and acceleration of a cargo or passenger compartment, such as the vehicle suspension system described in co-pending U.S. patent application Ser. No. 09/535,849. Accelerometer 28 could measure the acceleration of the passenger or cargo compartment, and reference element accelerometer could measure the acceleration of the wheel or ground engaging device. Such an implementation could allow for a more accurate calculation and execution of a trajectory plan and better operation of the active vehicle suspension.

Figure 15:
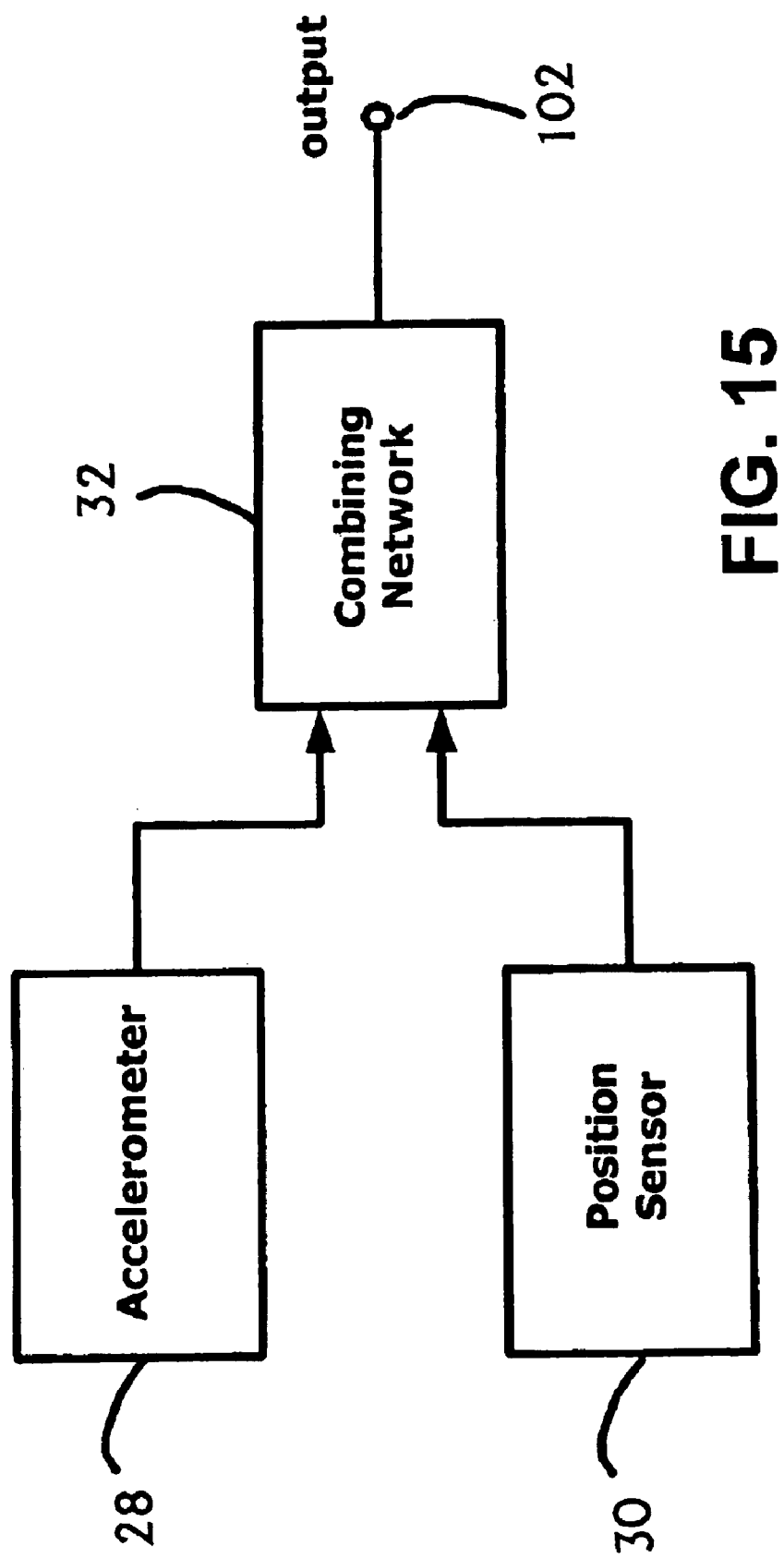
FIGS. 15 and 16 are block diagrams of an open loop system incorporating the invention.
Figure 16:
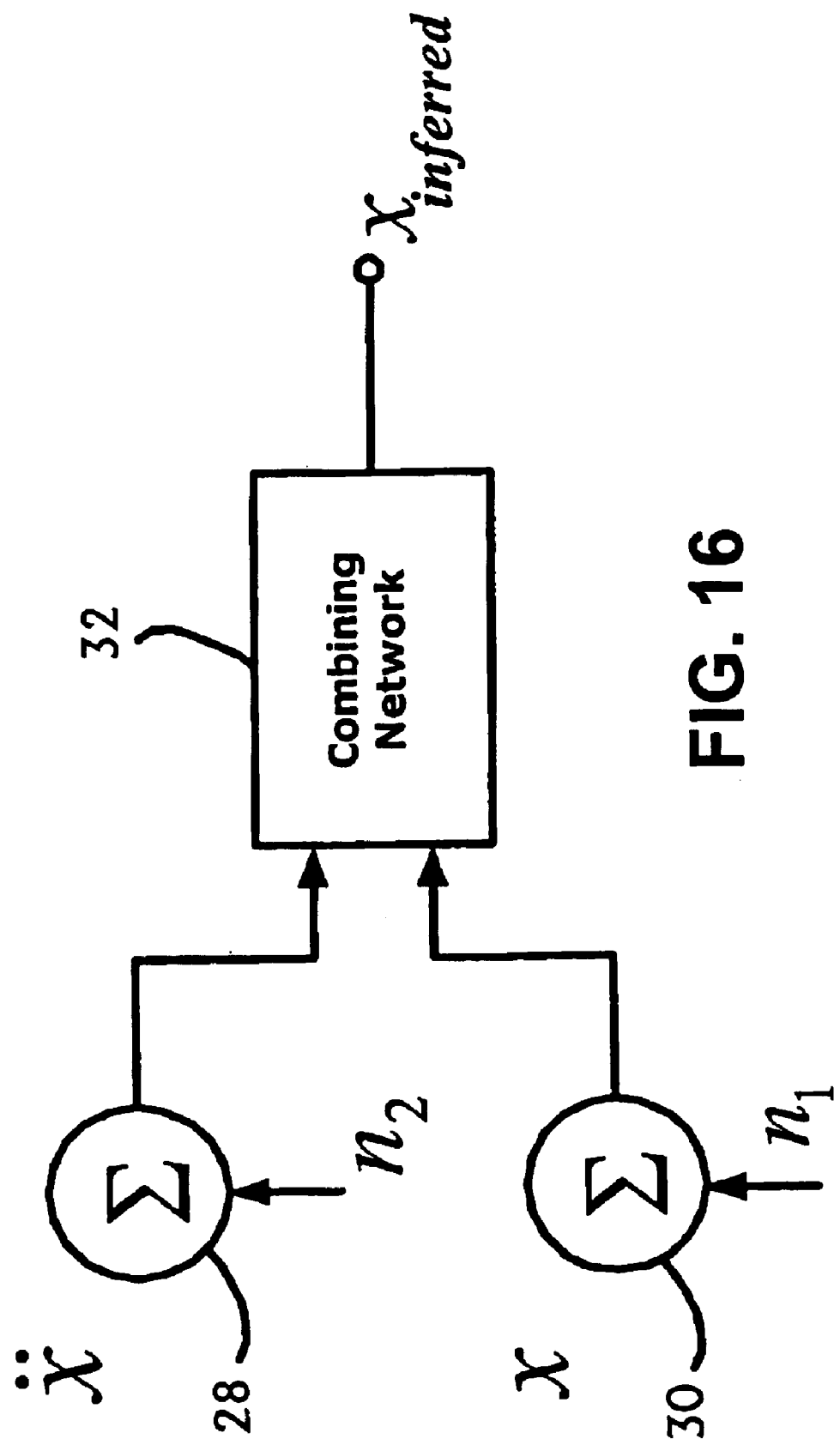

Referring to FIGS. 15 and 16, there is shown an open loop system incorporating the invention. In FIG. 15, an accelerometer 28 and a position sensor 30 are coupled to combining network 32. The combining network 32 outputs a signal representative of position at output terminal 102.

In FIG. 16, accelerometer 28 and position sensor 30 are represented as summers which receive noise $n_2$ and $n_1$ in addition to the signal representative of acceleration x and the signal representative of position x, respectively. Combining network 32 may take the forms of the element 32' of FIG. 3, element 32" of FIG. 5, element 32''' of FIG. 6, or element 32'''' of FIG. 10 and can be implemented by the circuits of FIGS. 7 and 12. The output $x_{inferred}$ could represent x as noted in the discussion of FIG. 10.

The implementation of FIGS. 15 and 16 is useful in position detectors for data acquisition situations in which feedback is not required. Examples may include instrumentation, for example an altimeter in which the position is derived from pressure sensing, and the acceleration represents vertical acceleration. Another example may include mobile and high speed tracking, profiling, or surveying equipment, in which the position detection or measurement device is supplemented by an accelerometer measuring the acceleration of the position detection and measurement device.

Figure 17:
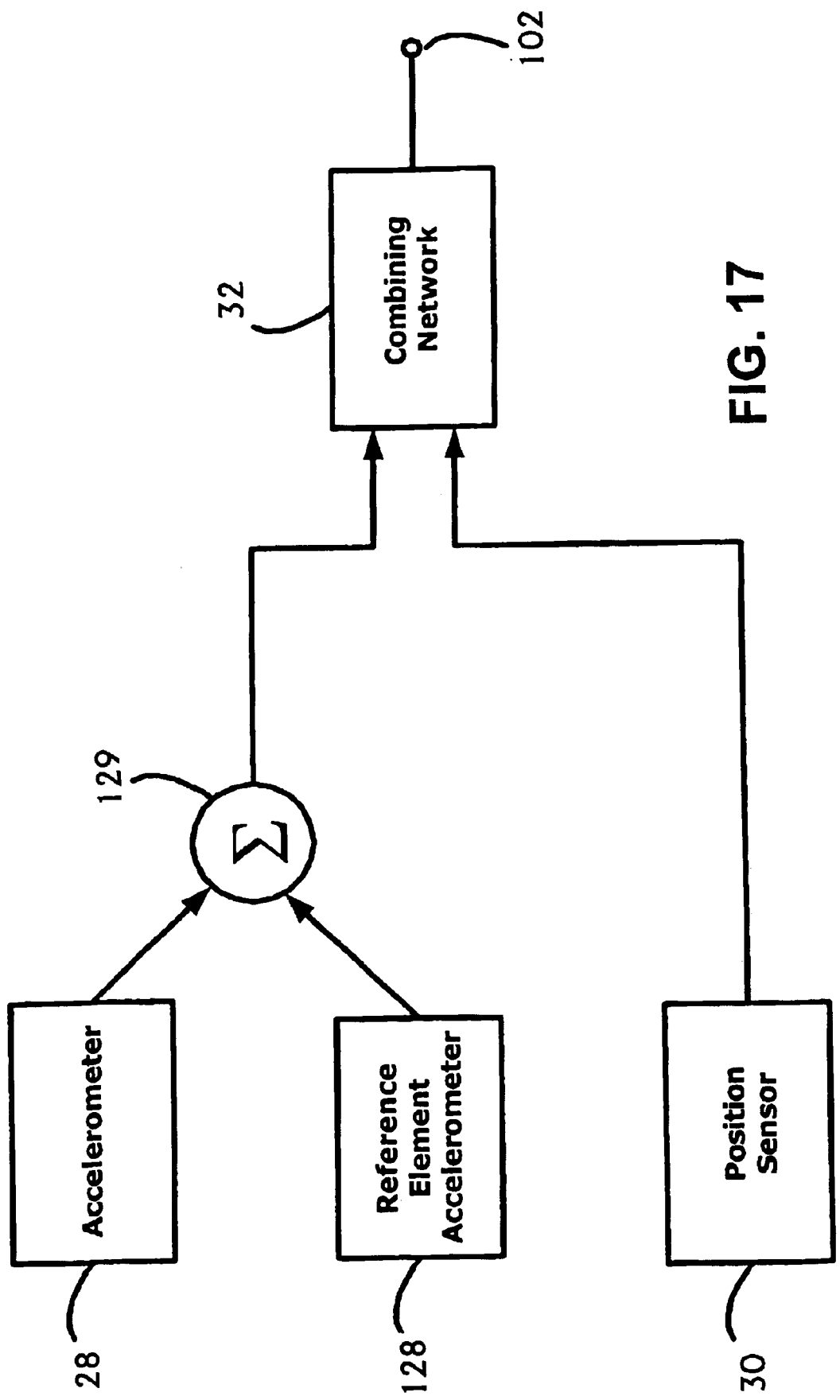

Referring to FIGS. 17 and 18, there is shown an open loop system incorporating the invention and additionally including position sensor 30, reference element accelerometer 128 and acceleration combiner 129 similar to the like-numbered elements of FIGS. 13 and 14. In FIGS. 17 and 18, combining network 32 may take the forms of the element 32' of FIG. 3, element 32" of FIG. 5, element 32'" of FIG. 6, or element 32"" of FIG. 10, and can be implemented by the circuits of FIGS. 7 and 12.

An implementation according to FIGS. 17 and 18 is useful in position detectors in which a reference element cannot be assumed to be an inertial ground and which do not require feedback. Practical examples may include instrumentation systems similar to the examples stated above in the discussion of FIGS. 13 and 14, but which display or record the inferred position as output data rather than using the inferred position in a feedback loop.

Other embodiments are within the claims.

What is claimed is:

1. Position detection apparatus, comprising:
    an accelerometer for providing an acceleration signal representative of acceleration of a movable element,
    a combining network having an acceleration input for receiving said acceleration signal, a position input for receiving a position signal representative of position of said movable element, and an output for providing an inferred position original representative of an inferred position of said movable element,
    said network including a first signal processor for processing said acceleration signal to provide a modified acceleration signal, said first signal processor comprising a low-pass filter,
    a second signal processor for processing said position signal to provide a modified position signal, and
    a combiner for additively combining said modified acceleration sign with said modified position signal to provide said inferred position signal.

2. Position detection apparatus in accordance with claim 1, further comprising:
    a second accelerometer, for providing a reference element signal representative of acceleration of a reference element;
    a differential acceleration measuring element, comprising
    a first acceleration input for receiving said movable element acceleration signal,
    a second acceleration input for receiving said reference element acceleration signal, and an output for providing a differential output signal representation of a differential acceleration of said movable acceleration signal and said reference element acceleration signal,
    wherein said combining network acceleration input is or receiving said differential acceleration signal, and
    wherein said combining network first signal processor is or processing said differential acceleration signal to provide said modified acceleration signal.

3. Position detection method for processing a movable element acceleration signal and a measured position signal representative of acceleration and position, respectively, of a movable element and for processing reference element acceleration signal representative of acceleration of a reference element to provide an inferred position signal said method comprising:
    differentially combining said movable element acceleration signal and said reference element acceleration signal to provide a differential acceleration signal representative of differential acceleration of said movable element and said reference element;
    low pass filtering said differential acceleration signal; and
    additively combining the low pass filtered differential acceleration signal with said measured position signal to provide said inferred position signal.

4. Closed loop motion control apparatus, comprising:
    a movable element having a position,
    an accelerometer for providing an acceleration signal representative of acceleration of said movable element,
    a combining element, for combining a reference position signal and an inferred position signal to provide an error signal,
    a controller, for providing a control signal responsive to said error signal, an actuator, for applying a force, responsive to said control signal, to said movable element to change said position, said force resulting in said acceleration of said movable element,
    a feedback loop, for providing said inferred position signal, said feedback loop comprising a combining network for providing said inferred position signal, said combining network including
    an acceleration input for receiving said acceleration signal,
    a position input for receiving a position signal representative of position of said movable element, and
    an output for providing an inferred position signal representative of an inferred position of said movable element,
    said network including a first signal processor for processing said acceleration signal to provide a modified acceleration signal, said first signal processor comprising a low-pass filter,
    a second signal processor for processing said position signal to provide a modified position signal, and
    a combiner for additively combining said modified acceleration signal with said modified position signal to provide said inferred position signal.

5. Closed loop motion control apparatus in accordance with claim 4, further comprising
    a reference element,
    a second accelerometer, for providing a reference element acceleration signal representative of acceleration of said reference element;
    a differential acceleration measuring element, comprising
    a first acceleration input for receiving said movable element acceleration signal,
    a second acceleration input for receiving said reference element acceleration signal, and
    an output for providing a differential output signal representative of a differential acceleration of said movable acceleration signal and said reference element acceleration signal,
    wherein said combining network acceleration input is for receiving said differential acceleration signal, and
    wherein said combining network first signal processor is for processing said differential acceleration signal to provide said modified acceleration signal.

6. Open loop position detection apparatus, comprising:
    an accelerometer for providing an acceleration signal representative of acceleration of a movable element,
    a combining network having an acceleration input for receiving said acceleration signal, a position input for receiving a position signal representative of position of said movable element, and an output for providing an inferred position signal representative of an inferred position of said movable element, said network including a first signal processor for processing said acceleration signal to provide a modified acceleration signal, said first signal processor comprising a low-pass filter, a second signal processor for processing said position signal to provide a modified position signal, and a combiner for additively combining said modified acceleration signal with said modified position signal to provide said inferred position signal.

7. Open loop position detecting apparatus in accordance with claim 6, further comprising a second accelerometer, for providing a reference element acceleration signal representative of acceleration of a reference element;

a differential acceleration measuring element, comprising a first acceleration input for receiving said movable element acceleration signal, a second acceleration input for receiving said reference element acceleration signal, and an output for providing a differential output signal representative of a differential acceleration of said movable acceleration signal and said reference element acceleration signal, wherein said combining network acceleration input is for receiving said differential acceleration signal, and wherein said combining network first signal processor is for processing said differential acceleration signal to provide said modified acceleration signal.

8. Position detection method for processing a movable element acceleration signal and a measured position signal representative of acceleration and position respectively, of a movable element and for processing a reference element acceleration signal representative of acceleration of a reference element to provide an inferred position signal, said method comprising;

low pass filtering said movable element acceleration signal to provide a low pass filtered movable element acceleration signal;

low pass filtering said reference element acceleration signal to provide a low pass filtered reference element acceleration signal;

differentially combining said low pass filtered movable element acceleration signal and said low pass filtered reference element acceleration signal to provide a differential acceleration signal representative of differential acceleration of said movable element and said reference element; and additively combining the differential acceleration signal with said measured position signal to provide said inferred position signal.

* * * * *

UNITED STATES PATENT AND TRADEMARK OFFICE
Certificate

Patent No. 6,940,248 B2                                                          Patented: September 6, 2005

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Robert Maresca, Hopkinton,, MA (US); Thomas Aho, Hudson, MA (US); and James A. Parison, New Ipswich, NH (US).

Signed and Sealed this Twenty-seventh Day of July 2010.

Walter Benson
*Supervisory Patent Examiner*
Art Unit 2837
Technology Center 2800